(12) United States Patent
Hill et al.

(10) Patent No.: US 10,151,271 B2
(45) Date of Patent: Dec. 11, 2018

(54) GAS DYNAMIC VALVE

(71) Applicant: United Technologies Corporation, Hartford, CT (US)

(72) Inventors: James D. Hill, Tolland, CT (US); Roger F. Blinn, Amston, CT (US); Michael J. Cuozzo, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 565 days.

(21) Appl. No.: 14/754,342

(22) Filed: Jun. 29, 2015

(65) Prior Publication Data

US 2016/0025040 A1    Jan. 28, 2016

Related U.S. Application Data

(60) Provisional application No. 62/029,914, filed on Jul. 28, 2014.

(51) Int. Cl.
*F02K 7/067* (2006.01)
*F02K 7/02* (2006.01)
*F17D 3/01* (2006.01)
*F02C 5/11* (2006.01)
*F02C 5/10* (2006.01)

(52) U.S. Cl.
CPC ............ *F02K 7/02* (2013.01); *F02C 5/10* (2013.01); *F02C 5/11* (2013.01); *F02K 7/067* (2013.01); *F17D 3/01* (2013.01)

(58) Field of Classification Search
CPC .... F02K 7/02; F02K 7/067; F02C 5/10; F02C 5/11
See application file for complete search history.

(56) References Cited

U.S. PATENT DOCUMENTS

| 2,727,535 | A | * | 12/1955 | Linderoth | ............... F02K 7/067 |
| | | | | | 137/803 |
| 2,912,821 | A | * | 11/1959 | Horak | ....................... F02K 7/04 |
| | | | | | 138/40 |
| 3,258,919 | A | * | 7/1966 | Klein | ......................... F02C 5/10 |
| | | | | | 137/251.1 |

(Continued)

FOREIGN PATENT DOCUMENTS

| EP | 1741916 | 1/2007 |
| GB | 1202895 | 8/1970 |

OTHER PUBLICATIONS

Extended European Search Report dated Dec. 8, 2015 in European Application No. 15178613.4.

*Primary Examiner* — Lorne Meade
(74) *Attorney, Agent, or Firm* — Snell & Wilmer, L.L.P.

(57) ABSTRACT

A flow-management system may comprise a center body impermeable to air. A conical surface of the center body may face forward. A blocking surface of the center body may be coaxial with the conical surface and may comprise an annular recess. An annular ring may be aft of the center body and fluidly coupled with the blocking surface. A tube may encase the center body and annular ring. The annular ring may comprise an air-foil shape to direct a pulse to the blocking surface. The blocking surface may comprise a central peak and a circular ridge separated by the annular recess.

11 Claims, 8 Drawing Sheets

(56) References Cited

U.S. PATENT DOCUMENTS

| | | | | |
|---|---|---|---|---|
| 3,303,643 A | * | 2/1967 | Beardsley | F02C 5/00 60/39.76 |
| 3,533,239 A | * | 10/1970 | Ghougasian | F02K 7/20 60/244 |
| 3,774,398 A | * | 11/1973 | Etessam | F02K 7/04 60/244 |
| 4,033,120 A | * | 7/1977 | Kentfield | F02C 5/10 60/249 |
| 7,828,546 B2 | * | 11/2010 | Wiedenhoefer | F02K 7/02 431/346 |

* cited by examiner

GAS DYNAMIC VALVE

CROSS-REFERENCE TO RELATED APPLICATIONS

This application is a nonprovisional of, and claims priority to, and the benefit of U.S. Provisional Application No. 62/029,914, entitled "GAS DYNAMIC VALVE," filed on Jul. 28, 2014, which is hereby incorporated by reference in its entirety.

FIELD

The present disclosure relates to pulse detonation engines (PDEs), and, more specifically, to a gas dynamic valve for use in a PDEs.

BACKGROUND

PDEs typically include a mechanism to prevent pressure pulses produced by detonations from flowing upstream. Valves having moving portions such as poppet valves, rotary valves, and OD sleeves may be used in PDEs to control gas flow during operation. However, the moving parts in these valves tend to wear down, limit the frequency of detonations, and reduce the efficiency of the PDE.

SUMMARY

A flow-management system may comprise a center body impermeable to gas, a conical surface of the center body facing forward, a blocking surface of the center body coaxial with the conical surface and comprising an annular recess, and an annular ring aft of the center body and fluidly coupled with the blocking surface.

In various embodiments, the flow-management system may comprise a tube encasing the center body and annular ring. The annular ring may comprise an air-foil shape to direct a pulse to the blocking surface. The blocking surface may comprise a central peak and a circular ridge separated by the annular recess. The center body may be axially symmetric. A strut may be mounted to the conical surface of the center body.

A pulse detonation engine may comprise a tube, a center body fixed to the tube, a conical surface of the center body facing forward, and a blocking surface of the center body coaxial with the conical surface and comprising an annular recess. The blocking surface may be impermeable to gas. The pulse detonation engine may further comprise a duct defined by the conical surface and tube, and an annular ring may be aft of the center body and comprise an air-foil shape configured to divert a pulse towards the blocking surface.

In various embodiments, the air-foil shape of the annular ring may be further configured to divert the pulse away from the duct. The conical surface may be impenetrable to gas. The center body may be axially symmetric. The blocking surface may comprise a central peak and a circular ridge separated by the annular recess. A first strut may connect the tube and center body. A second strut may connect the tube and annular ring. A detonation zone may be in the tube and aft of the annular ring. The pulse may originate from the detonation zone.

A pulse detonation engine may comprise a tube comprising an intake and an exhaust, an intake manifold may be connected to the intake, a central tube may be aft of the intake manifold and comprise a detonation zone, and an exhaust manifold may be forward of the detonation zone and comprise a split passage that extends radially outward in a forward direction and curves and extends in an aft direction.

In various embodiments the intake manifold may comprise a nickel-chromium alloy. The exhaust manifold may begin radially inward from the intake manifold and curve radially outward from the intake manifold. The intake manifold may split radially outward and towards the exhaust.

In various embodiments, the exhaust manifold may flow into an annular passage around the central tube. The central tube and annular passage may join at the exhaust. The exhaust manifold may terminate forward of the detonation zone.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the exhaust of the pulse detonation engine (PDE). As used herein, "forward" refers to the direction associated with the intake of the pulse detonation engine.

Figure 1:
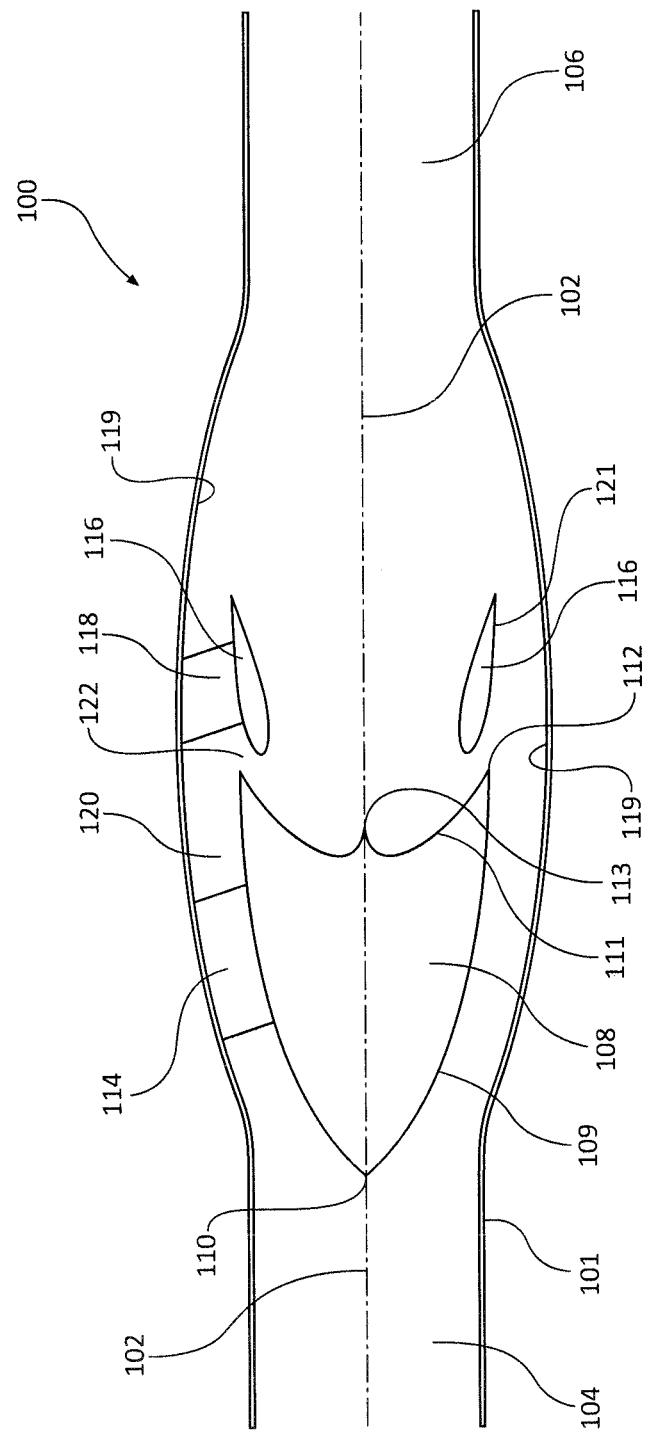
FIG. 1 illustrates a cross section of a pulse detonation engine having a center body, in accordance with various embodiments.

In various embodiments, and with reference to FIG. 1, a pulse detonation engine (PDE) 100 may comprise detonation tube 101 with a center body 108 to manage gas flow incident to detonations within the tube. Detonation tube 101 may be axially symmetric about axis 102. Detonation tube 101 may include inlet or intake 104 at the forward end of the tube and exhaust 106 at the aft end of the tube. The diameter of detonation tube 101 may increase between intake 104 and exhaust 106 to define a cavity with center body 108 disposed proximate the forward portion of the cavity. Center body 108 may be mounted in detonation tube 101 between intake 104 and exhaust 106.

In various embodiments, center body 108 may comprise a nose cone comprising conical surface 109 having a vertex 110 oriented towards intake 104. Vertex 110 of conical surface 109 may protrude from the cavity in detonation tube 101 and extend into intake 104. Conical surface 109 of center body 108 may be axially symmetric about axis 102 of detonation tube 101. Center body 108 may include a catcher or blocking surface 111 opposite and aft of conical surface 109. Blocking surface 111 may comprise a circular ridge 112 around the perimeter of blocking surface 111 and a central peak 113 on axis 102 of detonation tube 101. Circular ridge 112 and central peak 113 of blocking surface 111 may be separated by an annular recess in blocking surface 111. Circular ridge 112 of blocking surface 111 may also be the portion of center body 108 that is most aft, with circular ridge 112 extending further rearward than the central peak 113 of blocking surface 111. Blocking surface 111 and conical surface 109 may be impermeable to gas, such as air. Blocking surface 111 of center body 108 may have any contour suitable or capable to block or reverse the flow of gases moving forward from a detonation point and provide uninterrupted gas flow into detonation tube 101 for subsequent detonations. Blocking surface 111 may prevent undesirable pressure pulses within intake 104 after detonations by managing gas flow within the tube.

In various embodiments, center body 108 may be a hollow structure, a solid structure and/or a structure having both solid and hollow portions. In various embodiments, center body 108 is hollow to provide for weight savings relative to a solid center body. Center body 108 may be mounted to detonation tube 101 by one or more struts 114 with the struts attached to conical surface 109 of center body 108 and inner surface 119 of detonation tube 101. Strut 114 may be cast as an integral piece with center body 108 or formed separately and attached to center body 108 and/or detonation tube 101 by a weld, bolt, fastener and/or any other suitable attachment method. Strut 114 may be elongated in the forward direction or comprise a cross-sectional profile in the shape of an air foil or ellipse with the major axis of the ellipse oriented towards vertex 110 of conical surface 109.

In various embodiments, an annular ring 116 may be mounted to detonation tube 101 aft of center body 108 by a strut 118. Strut 118 is mounted to a surface of annular ring 116 adjacent to inner surface 119 of detonation tube 101. Annular ring 116 may comprise a cross-sectional profile in the shape of an air foil. The forward edge of annular ring 116 may be directed radially inward with respect to axis 102 and oriented towards blocking surface 111 of center body 108. Annular ring 116 is axially separated along axis 102 from center body 108 by passage 122. In this regard, annular ring 116 may be in fluid communication with blocking surface 111 of center body 108. Annular ring 116 may include a trailing edge that is directed radially outward and towards an inner surface 119 of detonation tube 101. Strut 118 may be cast as an integral piece with annular ring 116 or formed separately and attached to annular ring 116 and/or detonation tube 101 by a weld, bolt, fastener and/or any other suitable attachment method. Strut 118 may be elongated in the forward direction or comprise a cross-sectional profile in the shape of an ellipse with the major axis of the ellipse oriented in a direction from forward to aft.

In various embodiments, center body 108, annular ring 116, and struts 114 and 118 may be formed from any suitable material capable of sustaining high thermal loads. In this regard, center body 108, annular ring 116, and struts 114 and 118 may be a high performance alloy (e.g., an austenitic nickel-chromium-based alloy such as the austenitic nickel-chromium-based alloy sold under the mark INCONEL), a high temperature composite, ceramic, and/or the like. Center body 108, annular ring 116, and struts 114 and 118 may be made using metal working processes such as casting, fabrication, and/or additive manufacturing processes.

In various embodiments, an annular duct 120 extends around center body 108 within detonation tube 101 and may be defined by the conical surface 109 of center body 108 and inner surface 119 of detonation tube 101. Annular duct 120 may extend around annular ring 116 and detonation tube 101 and may be further defined by an outer surface 121 of annular ring 116 and the inner surface 119 of detonation tube 101. Struts 114 and 118 pass through annular duct 120 to mount center body 108 and annular ring 116 to detonation tube 101.

Figure 2A:
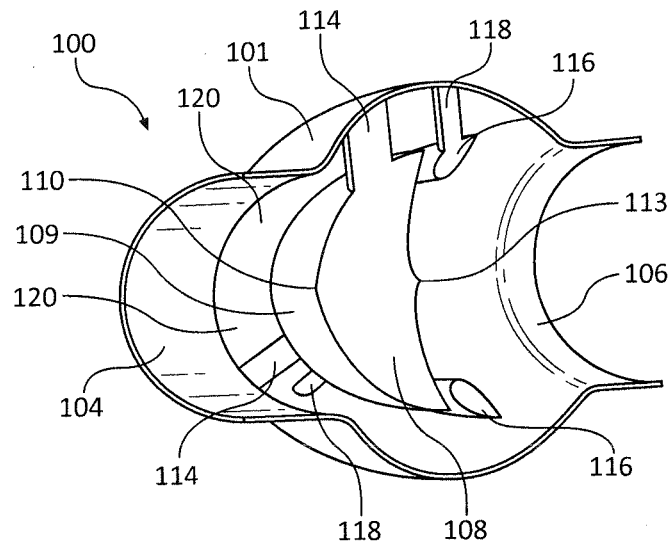
FIG. 2A illustrates a three-dimensional cutaway of a pulse detonation engine with a center body, in accordance with various embodiments.

FIG. 2A illustrates a three-dimensional cutaway of a PDE with a center body to manage gas flow incident to detonations within the PDE, in accordance with various embodiments. Conical surface 109 of center body 108 may include vertex 110 on axis 102 with vertex 110 pointed towards the circular opening of intake 104. Center body 108 may be mounted to detonation tube 101 by one or more struts 114 passing through annular duct 120 with each strut 114 equidistant from adjacent struts 114. Similarly, annular ring 116 may be mounted to detonation tube 101 by one or more struts 118 passing through annular duct 120 with each strut 118 equidistant from adjacent struts 118. Struts 114 and 118 may be aligned so that a strut 114 attached to center body 108 is coplanar with a strut 118 attached to annular ring 116 on a plane containing axis 102. Center body 108 and annular ring 116 may be separated by passage 122 defined by blocking surface 111 and a leading edge of annular ring 116. Passage 122 may be aligned radially outward and towards exhaust 106 where passage 122 joins annular duct 120 so that gas passing through passage 122 may be directed aft.

Figure 2B:
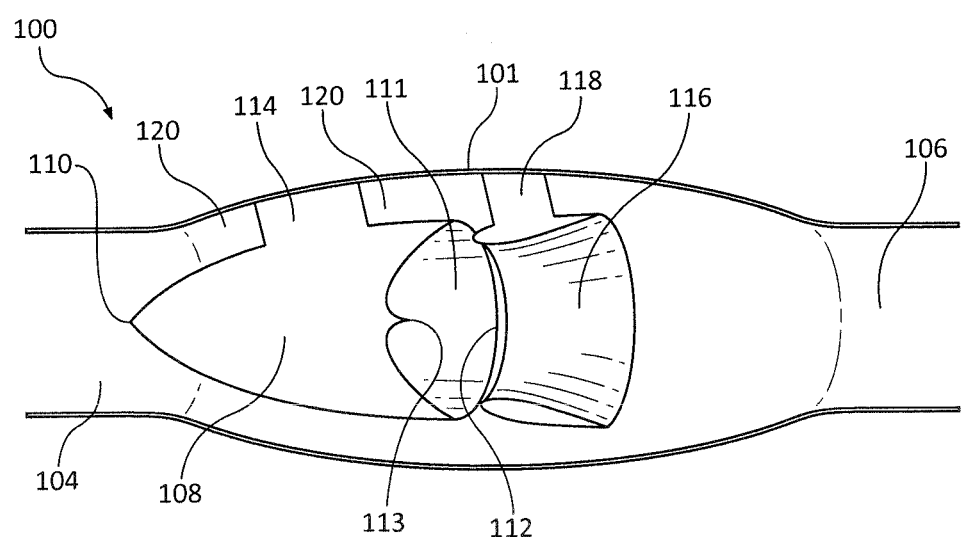
FIG. 2B illustrates a three-dimensional cutaway of a pulse detonation engine with a center body, in accordance with various embodiments.

FIG. 2B illustrates a three-dimensional cutaway of a PDE with a center body to manage gas flow incident to detonations within the PDE, in accordance with various embodiments. Blocking surface 111 may comprise a hemispherical surface with a circular ridge 112 and an annular recess with a central peak 113 on axis 102 and coaxial with vertex 110 of conical surface 109. Passage 122 between annular ring 116 and center body 108 may physically separate annular ring 116 from center body 108.

Figure 3A:
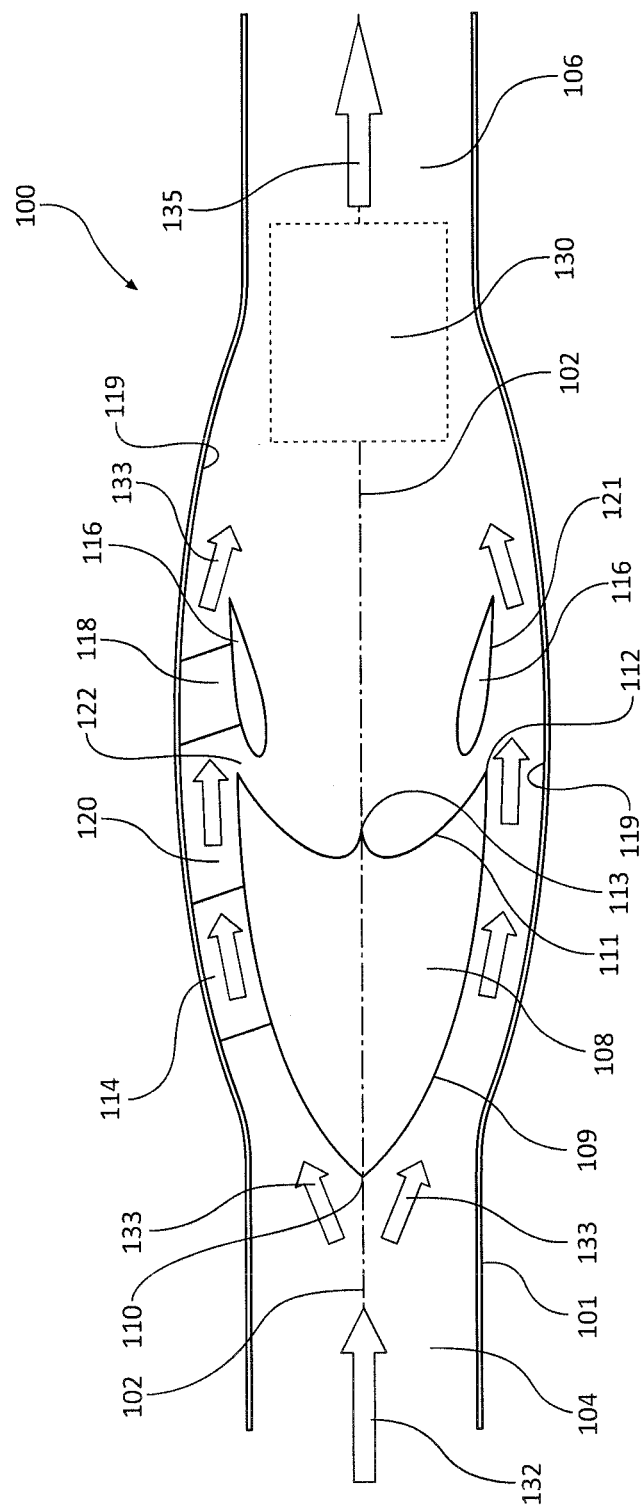
FIG. 3A illustrates a cross section of a pulse detonation engine with a center body managing gas flow during normal operation absent a detonation, in accordance with various embodiments.

FIG. 3A illustrates a cross section of a PDE with a center body managing gas flow during normal operation absent a detonation, in accordance with various embodiments. Primary flow 132 may enter intake 104, flowing from forward to aft, towards conical surface 109 of center body 108. Primary flow 132 may flow into conical surface 109 and may be forced radially outward as primary flow 133 flowing through annular duct 120 by conical surface 109. Primary flow 133 flows around center body 108 in annular duct 120.

In various embodiments, primary flow 133 may continue through annular duct 120, around struts 114, across passage 122, and over outer surface 121 of annular ring 116 towards exhaust 106. Primary flow 133 may be directed radially inward by inner surface 119 of detonation tube 101 and may reconvene as primary flow 135 in the central region of detonation tube 101 aft of annular ring 116 prior to exiting exhaust 106. When no pressure pulse is present in detonation tube 101, primary flow 135 may flow into and past detonation zone 130 and out exhaust 106. Primary flow 132 can flow over center body in a non-turbulent and/or substantially non-turbulent manner to provide enough gas flow to operate at desired detonation frequencies.

Figure 3B:
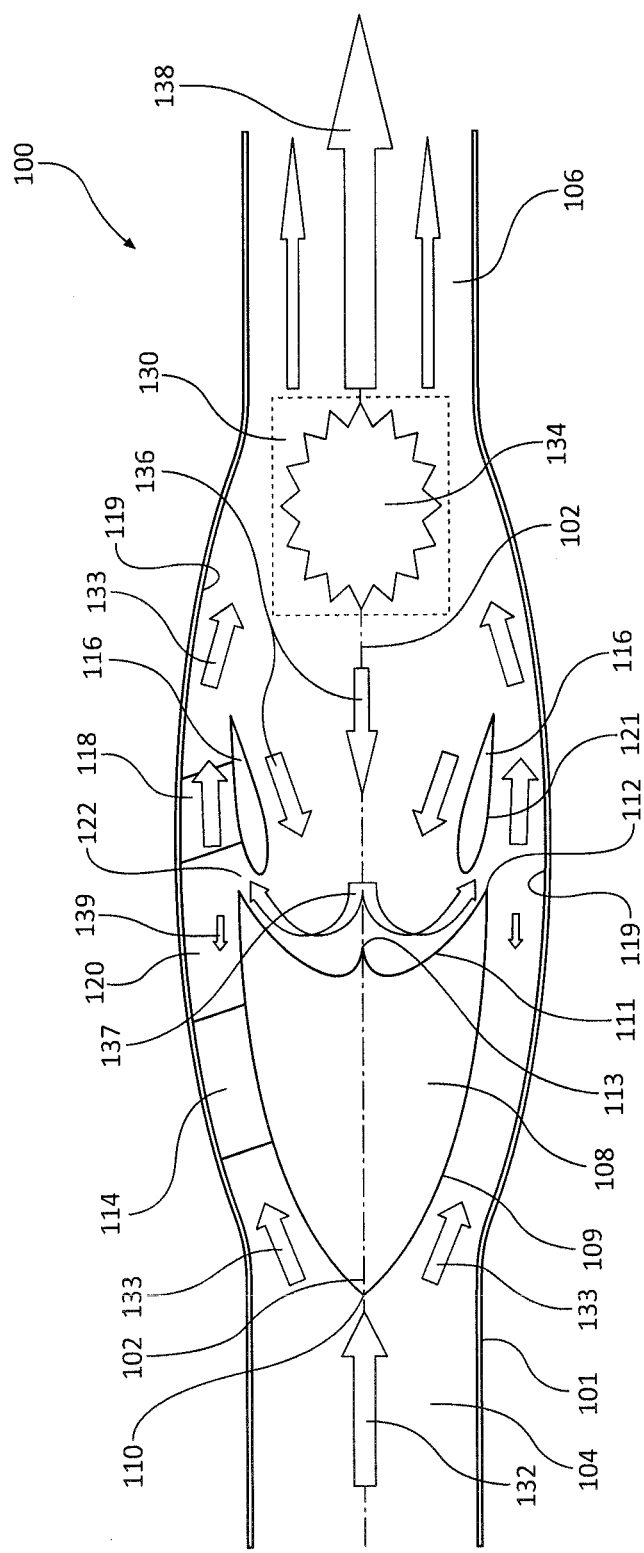
FIG. 3B illustrates a cross section of a pulse detonation engine with a center body managing gas flow resultant from a detonation within the engine, in accordance with various embodiments.

FIG. 3B illustrates a cross section of a PDE with a center body managing gas flow resultant from a detonation within the engine, in accordance with various embodiments. Primary flow 132 may enter into intake 104 flowing, from forward to aft, towards conical surface 109 of center body 108. Primary flow 132 may hit conical surface 109 of center body 108 and be forced radially outward and into annular duct 120 by conical surface 109. Detonation event 134 creates a pressure pulse 136 of gas directed forward towards intake 104 and a pressure pulse 138 of gas directed downstream towards exhaust 106. Detonation event 134 may be a supersonic combustion of a fuel/air mixture in detonation tube 101. Pressure pulse 136 may flow forward through annular ring 116 towards center body 108. Annular ring 116 may direct pressure pulse 136 radially inward and towards blocking surface 111 of center body 108.

In various embodiments, pressure pulse 136 may be directed aft and radially outward by blocking surface 111 and continue aft through passage 122, over the outer surface of annular ring 116, and towards exhaust 106. A small portion 139 of pressure pulse 136 may flow past blocking surface 111 and forward into annular duct 120. Blocking surface 111 may cause a swirling motion in pressure pulse 136 wherein the swirling pressure pulse limits forward gas flow and tends to send redirected pressure pulse 137 aft through passage 122 towards exhaust 106. Pressure pulse 136 may thus be prevented from flowing upstream beyond blocking surface 111, or a small portion 139 of pressure pulse 136 may flow beyond blocking surface 111 into annular duct 120 in the forward direction. Blocking surface 111 of center body 108 may redirect pressure pulse 136 towards exhaust 106 to increase thrust and engine efficiency. Blocking surface 111 may operate with no moving parts to reduce wear and tear and increase reliability. Blocking surface 111 of center body 108 may have any contour suitable to block or reverse the flow of gases moving forward from a detonation and tends to provide uninterrupted gas flow into detonation tube 101 for subsequent detonations. Blocking surface 111 may prevent undesirable pressure pulses within intake 104 after detonations by managing gas flow within the tube. Center body 108 may enable a PDE with blocking surface 111 to operate at desired detonation frequencies.

Figure 3C:
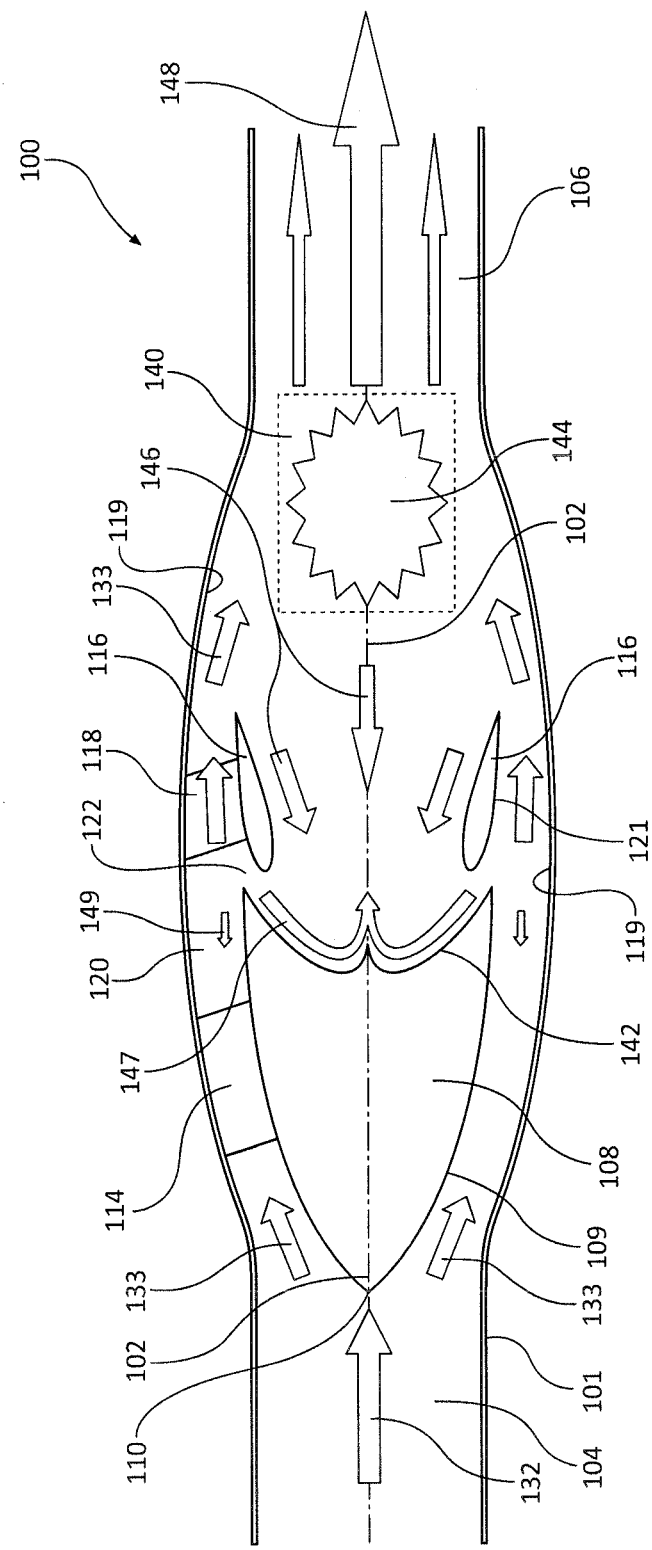
FIG. 3C illustrates a cross section of a pulse detonation engine with a center body managing gas flow resultant from a detonation within the engine, in accordance with various embodiments.

FIG. 3C illustrates a cross section of a PDE with a center body managing gas flow resultant from a detonation within the engine, in accordance with various embodiments. Primary flow 132 may enter into intake 104 flowing, from forward to aft, towards conical surface 109 of center body 108. Primary flow 132 may hit conical surface 109 of center body 108 and be forced radially outward and into annular duct 120 by conical surface 109 before flowing into detonation zone 140. Detonation event 144 creates a pressure pulse 146 of gas directed upstream towards intake 104 and a pressure pulse 148 of gas directed downstream towards exhaust 106. Detonation event 144 may be a supersonic combustion of a fuel/air mixture in detonation tube 101. Pressure pulse 146 may flow forward through annular ring 116 towards center body 108. Annular ring 116 may direct pressure pulse 146 radially inward and towards blocking surface 142 of center body 108. Pressure pulse 146 may be redirected aft at a central portion of blocking surface 142.

In various embodiments, a small portion 149 of pressure pulse 146 may flow past blocking surface 142 and forward into annular duct 120. Blocking surface 142 may cause a swirling motion in pressure pulse 146, which limits forward gas flow and tends to send redirected pressure pulse 147 aft. Pressure pulse 146 may thus be prevented from flowing upstream beyond blocking surface 142, or a small portion 149 of pressure pulse 146 may flow beyond blocking surface 142 into annular duct 120 in the forward direction. Blocking surface 142 of center body 108 may redirect pressure pulse 146 towards exhaust 106 to increase thrust and engine efficiency. Blocking surface 142 may operate with no moving parts to reduce wear and tear and increase reliability. Blocking surface 142 of center body 108 may have any contour suitable to block or reverse the flow of gases moving forward from a detonation and tends to provide uninterrupted gas flow into detonation tube 101 for subsequent detonations. Blocking surface 142 may prevent undesirable pressure pulses within intake 102 after detonations by managing gas flow within the tube. Center body 108 may enable a PDE with blocking surface 142 to operate at desired detonation frequencies.

Figure 4:
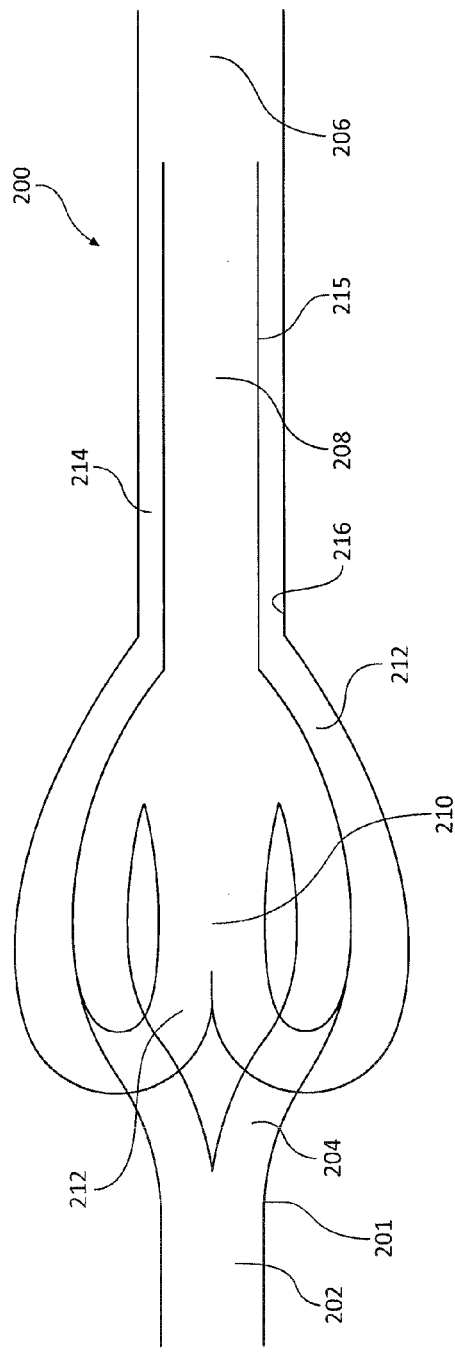
FIG. 4 illustrates a cross section of a pulse detonation engine with an intake manifold and an exhaust manifold to manage gas flow incident to detonations within the engine, in accordance with various embodiments.

FIG. 4 illustrates a cross section of a PDE with an intake manifold and an exhaust manifold to manage gas flow incident to detonations within the engine, in accordance with various embodiments. PDE 200 comprises detonation tube 201 further comprising intake 202 feeding into intake manifold 204. Intake manifold 204 may comprise split passages that split radially outward and aft towards exhaust 206. The split passages of intake manifold 204 may flow into central tube 208 with an exit port of intake manifold 204 forward of an exit port of split exhaust passages 212 of exhaust manifold 210. Central tube 208 may extend from exit ports of intake manifold 204 to exhaust 206.

In various embodiments, exhaust manifold 210 may comprise a central portion disposed forward of the exit ports of intake manifold 204. Exhaust manifold 210 splits into split exhaust passages 212. Split exhaust passages 212 may extend radially outward in a forward direction and then curve to extend in an aft direction. Split exhaust passages 212 may be disposed radially outward from intake manifold 204 and may extend adjacent to central tube 208 at a point proximate annular passage 214. Annular passage 214 may be radially outward from central tube 208 with annular passage 214 defined by an outer surface 215 of central tube 208 and an inner surface 216 of detonation tube 201. Annular passage 214 may extend the exhaust in an aft direction from split exhaust passages 212. Annular passage 214 and central tube 208 terminate at exhaust 206. Exhaust 206 may comprise a diameter greater than or equal to the outer diameter of annular passage 214 aft of central tube 208. Intake manifold 204 and exhaust manifold 210 may have any contour suitable to block or reverse the flow of gases and provide uninterrupted gas flow into detonation tube 201 while preventing undesirable pressure pulses within the intake after detonations.

In various embodiments, intake manifold 204 and exhaust manifold 210 may be formed from any suitable material capable of sustaining high thermal loads. In this regard, intake manifold 204 and exhaust manifold 210 may comprise a high performance alloy (e.g., an austenitic nickel-chromium-based alloy such as the austenitic nickel-chromium-based alloy sold under the mark INCONEL), a high temperature composite, ceramic, and/or the like. Intake manifold 204 and exhaust manifold 210 may be made using metal working processes such as casting, fabrication, and/or additive manufacturing processes.

Figure 5A:
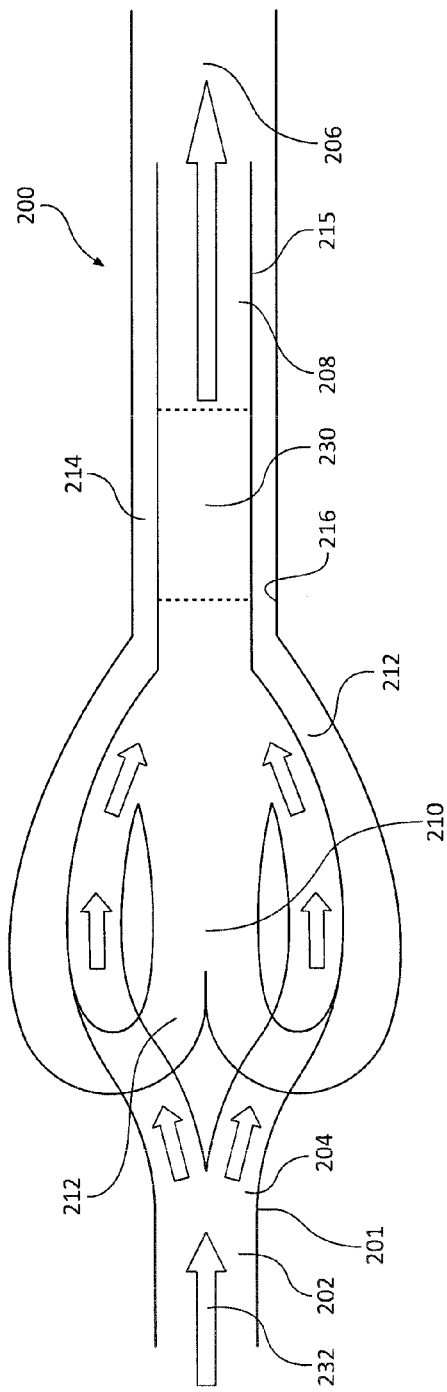
FIG. 5A illustrates a cross section of a pulse detonation engine with an intake manifold and an exhaust manifold managing gas flow during normal operation absent a detonation, in accordance with various embodiments.

FIG. 5A illustrates a cross section of a PDE with an intake manifold and an exhaust manifold managing gas flow during normal operation absent a detonation, in accordance with various embodiments. Primary flow 232 may enter into intake 202 and flow into intake manifold 204. Primary flow 232 may split into split passages of intake manifold 204 and reconvene downstream in central tube 208. Primary flow 232 may pass through detonation zone or chamber 230 and out exhaust 206 when no detonation event is occurring to provide gas for a detonation. Intake manifold and exhaust manifold may tend to provide uninterrupted gas flow into detonation tube 201 while preventing undesirable pressure pulses within the intake after detonations. Intake manifold 204 and exhaust manifold 210 may enable a PDE to operate at desired detonation frequencies.

Figure 5B:
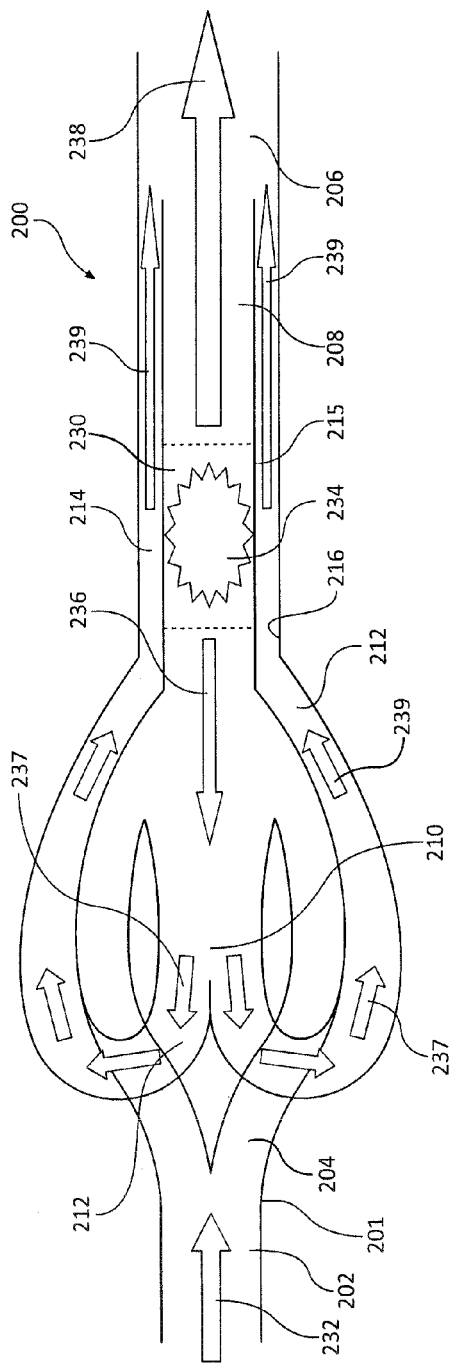
FIG. 5B illustrates a cross section of a pulse detonation engine with an intake manifold and an exhaust manifold managing gas flow during a detonation event, in accordance with various embodiments.

FIG. 5B illustrates a cross section of a PDE with an intake manifold and an exhaust manifold to manage gas flow resultant from a detonation within the engine, in accordance with various embodiments. Primary flow 232 may enter into intake 202 and flow into intake manifold 204. Primary flow 232 may split into split passages of intake manifold 204 and reconvene downstream in central tube 208. Detonation event 234 may occur in detonation zone 230 of central tube 208 and create pressure pulse 236 of exhaust gas flowing forward in the direction of intake 202 into exhaust manifold 210 and pressure pulse 238 flowing aft. Pressure pulse 236 may split into pressure pulse 237 in split exhaust passages 212, turn radially outward, redirect in an aft direction along split exhaust passages 212 and continue in an aft direction as redirected pressure pulse 239 towards exhaust 206.

In various embodiments, exhaust manifold 210 may redirect pressure pulse 236 from moving forward to moving aft towards exhaust 206 and increase efficiency of the PDE by harnessing the energy of pressure pulse 236. An aft pressure pulse 238 may flow through central tube 208 towards exhaust 206. Aft pressure pulse 238 may flow out central tube 208 past the exit port of annular passage 214 so that aft pressure pulse 238 tends to entrain the flow of redirected pressure pulse 239 exiting annular passage 214 in an aft direction. The entrainment by aft pressure pulse 238 may create a pressure drop in exhaust manifold 210, increasing the likelihood that pressure pulse 236 flows into exhaust manifold 210 instead of upstream into intake manifold 204 and intake 102. Pressure pulse 236 and aft pressure pulse 238 may then exit exhaust 206.

Figure 6:
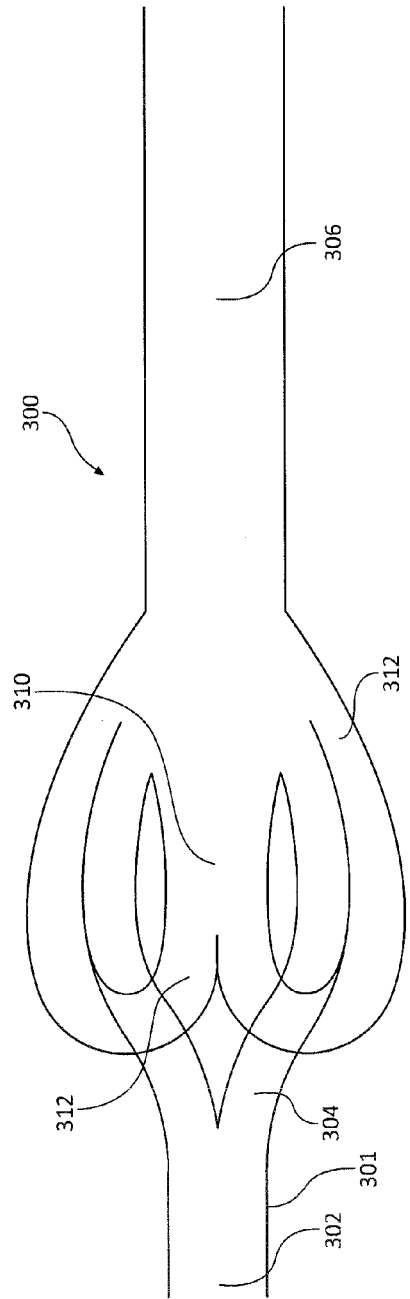
FIG. 6 illustrates a pulse detonation engine with an intake manifold and a short exhaust manifold to manage gas flow resultant from detonations, in accordance with various embodiments.

FIG. 6 illustrates a cross section of a PDE with an intake manifold and an exhaust manifold to manage gas flow incident to detonations within the engine, in accordance with various embodiments. PDE 300 comprises detonation tube 301 further comprising intake 302 feeding into intake manifold 304. Intake manifold 304 may comprise split passages that split radially outward and aft towards exhaust 306. The split passages of intake manifold 304 may reconvene into a central region of detonation tube 301 with an exit port of intake manifold 304 forward of an exit port of split exhaust passages 312 of exhaust manifold 310. The central region of detonation tube 301 may extend from exit ports of intake manifold 304 to exhaust 306.

In various embodiments, exhaust manifold 310 may comprise a central portion forward of the exit ports of intake manifold 304. Exhaust manifold 310 splits into split exhaust passages 312. Split exhaust passages 312 may extend radially outward in a forward direction and then curve to extend in an aft direction. Split exhaust passages 312 may be disposed radially outward from intake manifold 304 and may open into a central region of detonation tube 301 aft of the outlet of intake manifold 304. Exhaust 306 may extend from the outlet of split exhaust passages 312 to the aft end of detonation tube 301. Intake manifold 304 and exhaust manifold 310 may have any contour suitable to block or reverse the flow of gases and tend to provide uninterrupted gas flow into detonation tube 301 while tending to prevent undesirable pressure pulses within the intake after detonations.

In various embodiments, intake manifold 304 and exhaust manifold 310 may be formed from any suitable material capable of sustaining high thermal loads. In this regard, intake manifold 304 and exhaust manifold 310 may comprise a high performance alloy (e.g., an austenitic nickel-chromium-based alloy such as the austenitic nickel-chromium-based alloy sold under the mark INCONEL), a high temperature composite, ceramic, and/or the like. Intake manifold 304 and exhaust manifold 310 may be made using metal working processes such as casting, fabrication, and/or additive manufacturing processes.

Figure 7A:
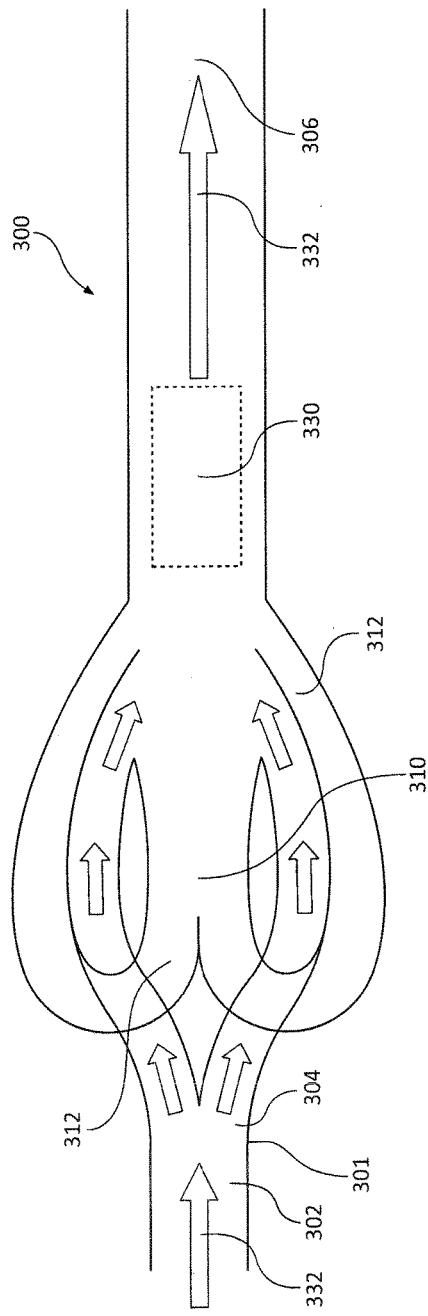
FIG. 7A illustrates a cross section of a pulse detonation engine with an intake manifold and an exhaust manifold managing gas flow during normal operation absent a detonation, in accordance with various embodiments.

FIG. 7A illustrates a cross section of a PDE with an intake manifold and an exhaust manifold managing gas flow during normal operation absent a detonation, in accordance with various embodiments. Primary flow 332 may enter into intake 302 and flow into intake manifold 304. Primary flow 332 may split into split passages of intake manifold 304. Primary flow 332 may pass through detonation zone or chamber 330 and out exhaust 306 when no detonation event is occurring to provide gas for a detonation. Intake manifold and exhaust manifold may tend to provide uninterrupted gas flow into detonation tube 301 while preventing undesirable pressure pulses within the intake after detonations. Intake manifold 304 and exhaust manifold 310 may enable a PDE to operate at desired detonation frequencies.

Figure 7B:
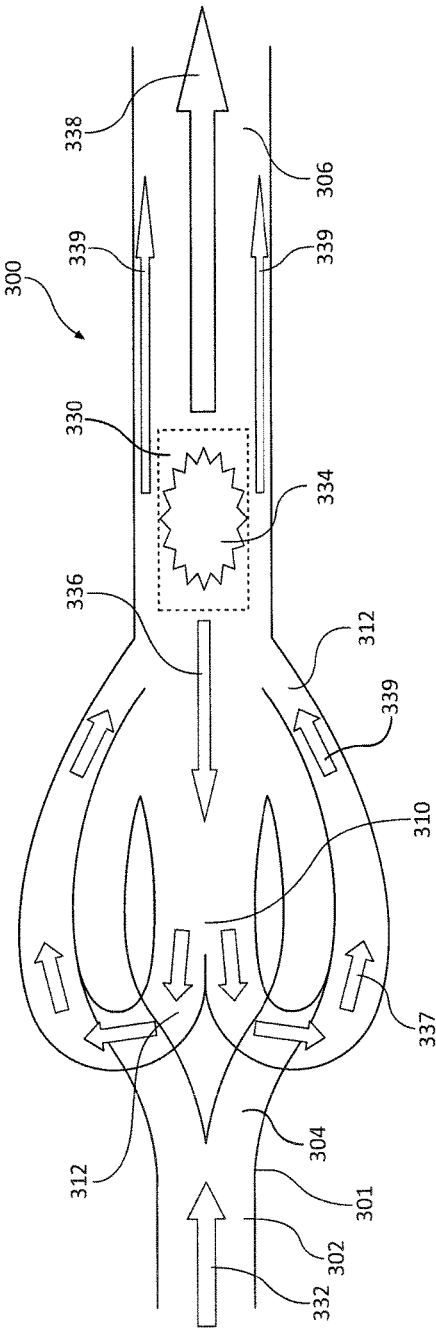
FIG. 7B illustrates a cross section of a pulse detonation engine with an intake manifold and an exhaust manifold managing gas flow during a detonation event, in accordance with various embodiments.

FIG. 7B illustrates a cross section of a PDE with an intake manifold and an exhaust manifold to manage gas flow resultant from a detonation within the engine, in accordance with various embodiments. Primary flow 332 may enter into intake 302 and flow into intake manifold 304. Primary flow 332 may split into split passages of intake manifold 304. Detonation event 334 may occur in detonation zone 330 and create pressure pulse 336 of exhaust gas flowing forward in the direction of intake 302 into exhaust manifold 310 and pressure pulse 338 flowing aft. Pressure pulse 336 enter into split exhaust passages 312 as split pressure pulse 337, turn radially outwards, redirect in an aft direction along split exhaust passages 312 and continue in an aft direction as redirected pressure pulse 339 towards exhaust 306.

In various embodiments, exhaust manifold 310 may redirect pressure pulse 336 from moving forward to moving aft towards exhaust 306 and increase efficiency of the PDE by harnessing the energy of pressure pulse 336. An aft pressure pulse 338 may flow through a central portion of detonation tube 301 towards exhaust 306. Pressure pulse 336 and aft pressure pulse 338 may then exit detonation tube 301 through exhaust 306.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 111(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flow-management system, comprising:
   a center body impermeable to gas;
   a conical surface of the center body facing forward;
   a blocking surface of the center body coaxial with the conical surface and comprising an annular recess disposed between a central peak and a circular ridge, wherein the circular ridge extends rearward of the central peak; and
   an annular ring aft of the center body and fluidly coupled with the blocking surface, wherein the annular ring is symmetrical about a centerline axis, wherein a distance between the centerline axis and a forward edge of the annular ring is smaller than a distance between the centerline axis and an aft edge of the annular ring.

2. The flow-management system of claim 1, further comprising a tube encasing the center body and annular ring.

3. The flow-management system of claim 1, wherein the annular ring comprises an air-foil shape to direct a pulse to the blocking surface.

4. The flow-management system of claim 1, wherein the center body is axially symmetric.

5. The flow-management system of claim 1, further comprising a strut mounted to the conical surface of the center body.

6. A pulse detonation engine comprising:
   a tube;
   a center body fixed to the tube;
   a conical surface of the center body facing forward;
   a blocking surface of the center body coaxial with the conical surface and comprising an annular recess disposed between a central peak and a circular ridge, wherein the circular ridge extends rearward of the central peak, wherein the blocking surface is impermeable to gas;
   a duct defined by the conical surface and tube; and
   an annular ring aft of the center body comprising an air-foil shape configured to divert a pulse towards the blocking surface, wherein the annular ring is symmetrical about a centerline axis, wherein a distance between the centerline axis and a forward edge of the annular ring is smaller than a distance between the centerline axis and an aft edge of the annular ring.

7. The pulse detonation engine of claim 6, wherein the air-foil shape of the annular ring is further configured to divert the pulse away from the duct.

8. The pulse detonation engine of claim 6, wherein the conical surface is impermeable to air.

9. The pulse detonation engine of claim 6, wherein the center body is axially symmetric.

10. The pulse detonation engine of claim 6, further comprising:
    a first strut connecting the tube and center body; and
    a second strut connecting the tube and annular ring.

11. The pulse detonation engine of claim 6, further comprising a detonation zone in the tube and aft of the annular ring, wherein the pulse originates from the detonation zone.

* * * * *